(12) United States Patent
Eggly et al.

(10) Patent No.: US 10,393,350 B2
(45) Date of Patent: Aug. 27, 2019

(54) LIGHT WITH INTEGRAL SPEED RING

(71) Applicant: The F. J. Westcott Company, Maumee, OH (US)

(72) Inventors: Eric R. Eggly, Perrysburg, OH (US); Christian B. Matthews, Holly Springs, NC (US)

(73) Assignee: The F.J. Westcott Company, Maumee, OH (US)

( * ) Notice: Subject to any disclaimer, the term of this patent is extended or adjusted under 35 U.S.C. 154(b) by 0 days.

(21) Appl. No.: 15/961,088

(22) Filed: Apr. 24, 2018

(65) Prior Publication Data

US 2018/0306415 A1 Oct. 25, 2018

Related U.S. Application Data

(60) Provisional application No. 62/488,897, filed on Apr. 24, 2017.

(51) Int. Cl.
*F21V 21/14* (2006.01)
*F21V 17/10* (2006.01)
*G03B 15/02* (2006.01)
*F21V 3/06* (2018.01)
*F21Y 105/18* (2016.01)
*F21Y 115/10* (2016.01)

(52) U.S. Cl.
CPC .......... *F21V 17/105* (2013.01); *F21V 3/0625* (2018.02); *F21V 21/14* (2013.01); *G03B 15/02* (2013.01); *F21Y 2105/18* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 6,010,234 A | * | 1/2000 | Rahn | G03B 15/06 362/278 |
| 6,030,087 A | * | 2/2000 | Whittle | F21V 7/18 362/18 |
| 2003/0086272 A1 | * | 5/2003 | Waltz | F21V 17/02 362/351 |
| 2005/0088836 A1 | * | 4/2005 | Lowe | G03B 15/06 362/18 |
| 2006/0203491 A1 | * | 9/2006 | Waltz | F21V 21/14 362/269 |
| 2006/0227527 A1 | * | 10/2006 | Malkanov | F21V 17/10 362/18 |
| 2007/0217772 A1 | * | 9/2007 | Lemelson | G03B 15/02 396/4 |
| 2013/0050994 A1 | * | 2/2013 | Pieper | F21S 8/026 362/147 |

* cited by examiner

*Primary Examiner* — Alexander K Garlen
(74) *Attorney, Agent, or Firm* — Marshall & Melhorn, LLC

(57) ABSTRACT

A light with an integral speed ring is disclosed. The light may have a cover that attaches to a support plate. The support plate has at least one metallic plate that the cover may attach to. The support plate also has a plurality of fins and slots, both of which may be used for cooling. An LED plate is located on the support plate. The LED plate has a plurality of LEDs mounted thereon. A ring is provided that may selectively rotate with respect to the support plate. The ring may have a plurality of apertures located in its outer diameter.

27 Claims, 6 Drawing Sheets

LIGHT WITH INTEGRAL SPEED RING

FIELD

A light with an integral speed ring is described. More particularly, a light for photography or videography is provided with an integral speed ring so that a light modifier can be easily positioned with, and attached to, the light.

BACKGROUND

A large part of photography is lighting. The lighting can be natural, or man-made, or a combination of the two. The right lighting can assist considerably in turning a regular photograph into a great photograph.

Some photographers use off-camera lighting to assist in their photography. Off-camera lighting is man-made lighting that is not typically physically attached to the camera. Instead, the camera and the lighting are connected to one another such as through wired or wireless devices.

Usually, compared with other types of lighting, off-camera lighting provides a greater range of lighting at least in terms of color, power, adjustability, flexibility, the number of lights and the types of lights for the photographer.

In some instances, it is desirable to modify the light coming from the off-camera light source. For example, it may be desirable to make the light softer, to deflect the light toward or away from the subject, and/or to color the light, just to name a few. Devices can be attached to the off-camera light source to modify the light in one or more of the examples given.

One example of a light modifier that can be attached to an off-camera light source is a softbox. A softbox diffuses light from a light source to produce softer shadows and provide a gentler light.

The softbox is a structure typically comprised of fabric and a frame or frame members. The frame/frame members may be comprised of materials such as plastic and/or metal. The frame may be made up of individual rods. The rods are located in pockets and/or channels in the fabric to cause the fabric to stretch between the rods and effectively create a tent.

The softbox is mounted to the light with a speed ring. In other words, the speed ring is the interface that connects the softbox with the light. The speed ring is a separate component and it is specific to the light. More particularly, the speed ring must be the same brand as the light or it will not fit on the light. While many speed rings are often available for a light, it requires the photographer to obtain a speed ring for each light the photographer wants to use for each component the photographer wants to attach to the light.

This is a significant disadvantage associated with the prior art. Namely, a photographer must only use one speed ring with one light with one light modifier. Since a photographer often has many different types of lights, it requires the photographer to then purchase, stock and maintain a speed ring for each light for each light modifier. This drives up expense and inventory for the photographer.

Another disadvantage with the prior art designs resides in how the light modifiers attach to the speed rings and lights. The rods of the softbox extend into channels or apertures in the speed ring to selectively secure the softbox to the speed ring. The speed ring also typically has a central aperture for receiving the light therethrough. One or more mechanical devices, such as fasteners, clips and/or couplings may be used to secure the speed ring to the light.

Thus, whenever a photographer wants to use a different light source with a particular softbox, the softbox, speed ring and light source combination must be disassembled and then reassembled. It can be appreciated that this process is undesirably time consuming and inconvenient, particularly during photo shoots.

In view of at least the disadvantages associated with the above-mentioned prior art devices, it would be advantageous to have a speed ring integrally formed with the light that can accept a wide variety of light modifiers.

SUMMARY

A light with an integral speed ring is disclosed. The light may have a cover that attaches to a support plate. The cover may attach to the support plate. The support plate also has a plurality of fins and slots, both of which may be used for cooling. An LED plate is located on the support plate. The LED plate has a plurality of LEDs mounted thereon. The speed ring may selectively rotate with respect to the support plate. The ring may have a plurality of apertures located in its outer diameter.

DETAILED DESCRIPTION

Figure 1:
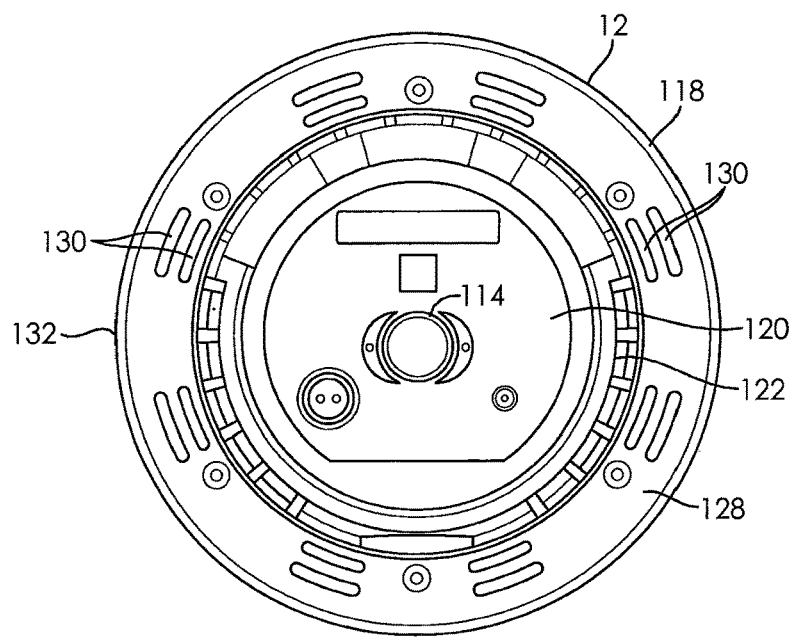
FIG. 1 is a top view of one embodiment of a light source with an integral speed ring.

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Referring now to all of the figures, one embodiment of a speed ring 10 on a light source 12 is depicted. The light source 12 may be any type of light including but not limited to LED, incandescent, fluorescent, halogen, halide or the like. The light source 12 in the figure happens to depict an LED light comprised of a plurality of individual LEDs 14 best seen in FIGS. 6 and 7. The LEDs 14 are arranged on and fixed to an LED plate 16 also shown in FIGS. 6 and 7. The individual LEDs 14 are connected to a source of power (described below) and a control module (described below).

The individual LEDs 14 in the figures are organized in concentric circular arrays, but other organizations and numbers of LEDs 14 are possible.

The LEDs 14 and the LED plate 16 may be selectively enclosed within a cover 18, as shown in FIGS. 3-6. Preferably, the cover 18 is translucent or semi-transparent. In one embodiment, when the LEDs 14 are off, the cover 18, prevents one from seeing the LEDs 14 behind it. The cover 18 may be entirely constructed of the same material, which may be plastic.

The figures depict the cover 18 as having a planar top 20 supported by a cylindrical, upstanding wall 22. It is permissible for the cover 18 to have other shapes and designs than those depicted in the figures.

A support flange 24 may extend perpendicular from the wall 22, but non-planar with the planar top 20. The support flange 24 may be substantially planar as it extends about the wall 22. In one embodiment, the support flange 24 is not continuous. Instead, the support flange 24 may be segmented where the segments may be separated by openings 26 of approximately equal length. The segments, however, may be of unequal length.

Figure 4:
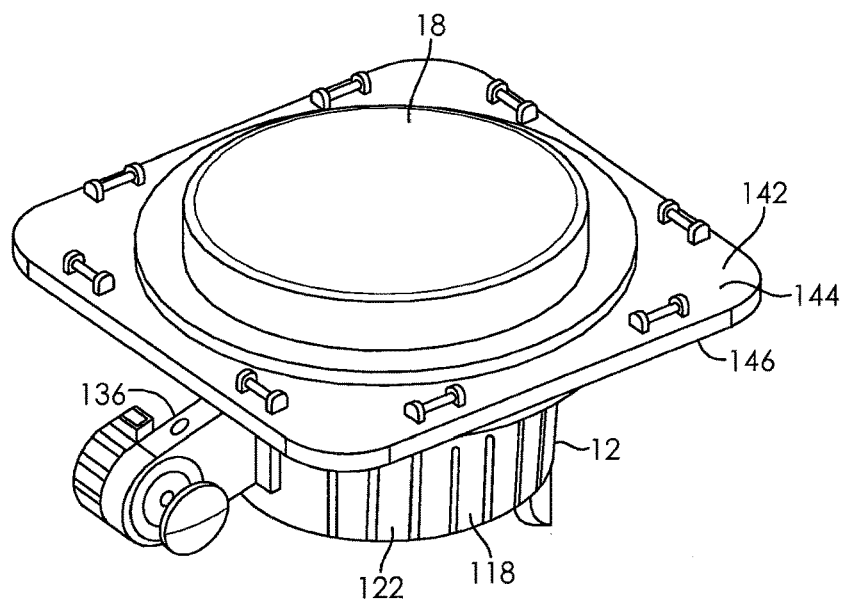
FIG. 4 is top/side perspective view of the light source with the integral speed ring of FIG. 1 with a frame for barn door type shutters to be attached.

In one embodiment, the segments may be comprised of long segments 28 and short segments 30. As shown in FIG. 4, the short segments 30 are located between the long segments 28 separated by the openings 26.

Figure 5:
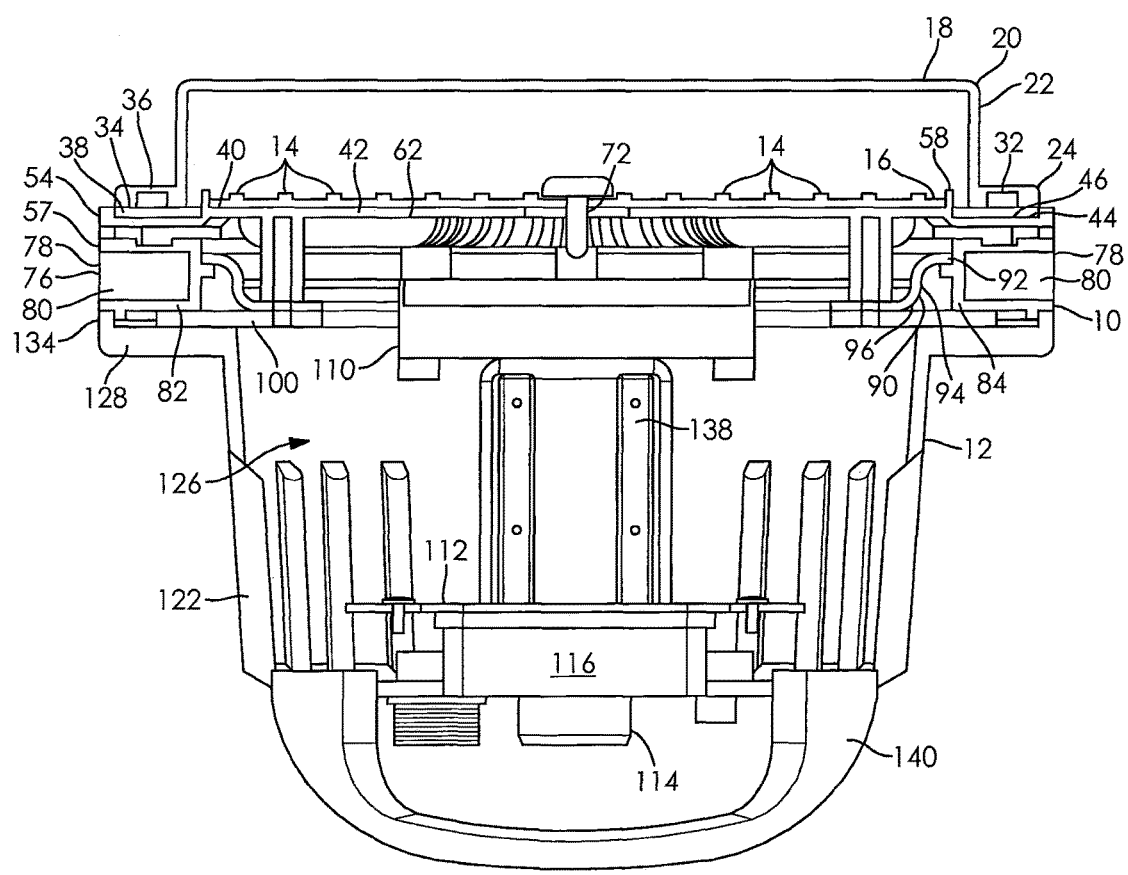
FIG. 5 is a cutaway side view of the light source with the integral speed ring of FIG. 1.

The short segments 30 may have a coupling device 32 attached thereto. In one embodiment the coupling device 32 may be such as a magnet. Magnets may be secured to an underside 34 of each of the short segments 30, as shown in FIG. 5. More particularly, the magnets may be housed in complementary shaped recesses 36 in the underside 34 of the short segments 30.

Figure 7:
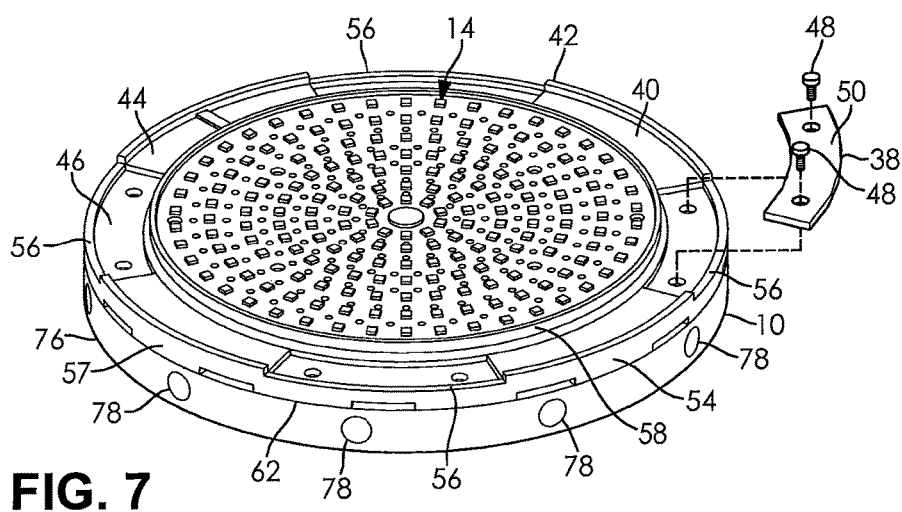
FIG. 7 is a perspective view of the integral speed ring and a component of the light source.
Figure 8:
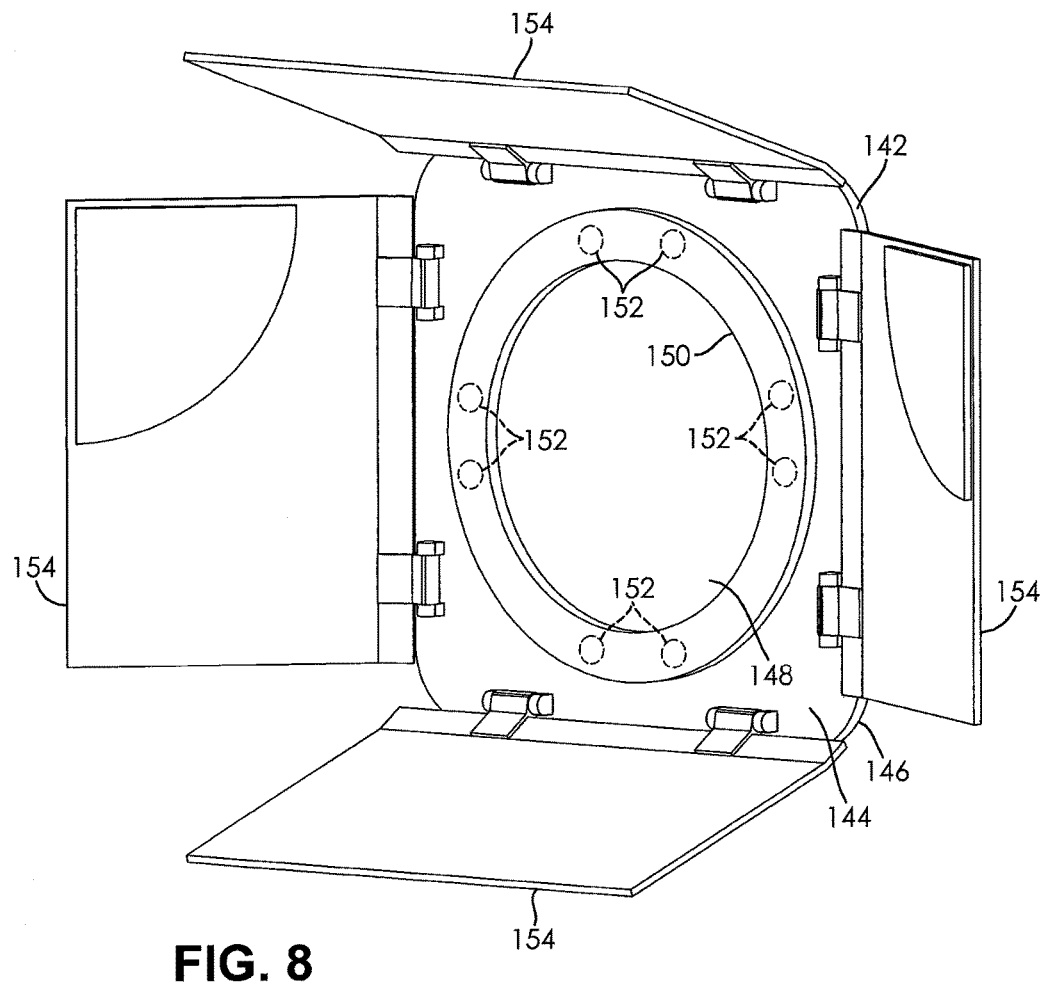
FIG. 8 is a perspective view of a barn door type mounting plate that may be selectively attached to the light source.

The magnets permit selective coupling of the cover 18 with metal plates 38. The metal plates 38 may be located on an upper surface 40 of a support plate 42. More particularly, as shown in FIG. 7 the upper surface 40 of the support plate 42 defines an outer channel 44. Recessed segments 46 may be in the upper surface 40 equally spaced about the outer channel 44. The plates 38 may be located in the recessed segments 46 and selectively secured thereto with mechanical fasteners 48. When the plates 38 are located in the recessed segments 46, their upper surfaces 50 are substantially coplanar with an upper surface 52 of the outer channel 44.

In an alternative embodiment, the support plate 42 may be constructed of a metal that is attractive to the magnets.

The cover long and short segments 28, 30 may be selectively located in the outer channel 44 of the support plate 42. As noted above, the short segments 30 are located over the metallic plates 38 and the long segments 28 are located on the upper surface 52 of the outer channel 44, which can be appreciated from FIGS. 3 and 5.

Figure 2:
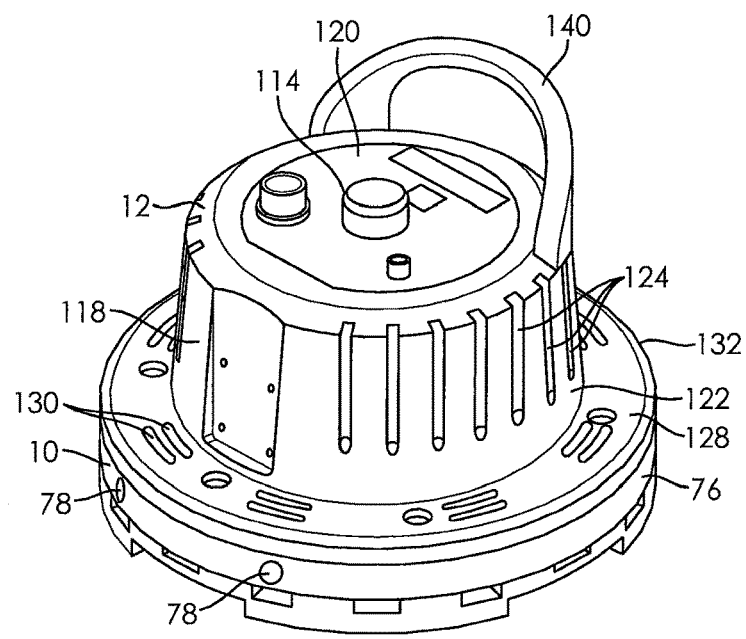
FIG. 2 is a bottom/side perspective view of the light source with the integral speed ring of FIG. 1.
Figure 3:
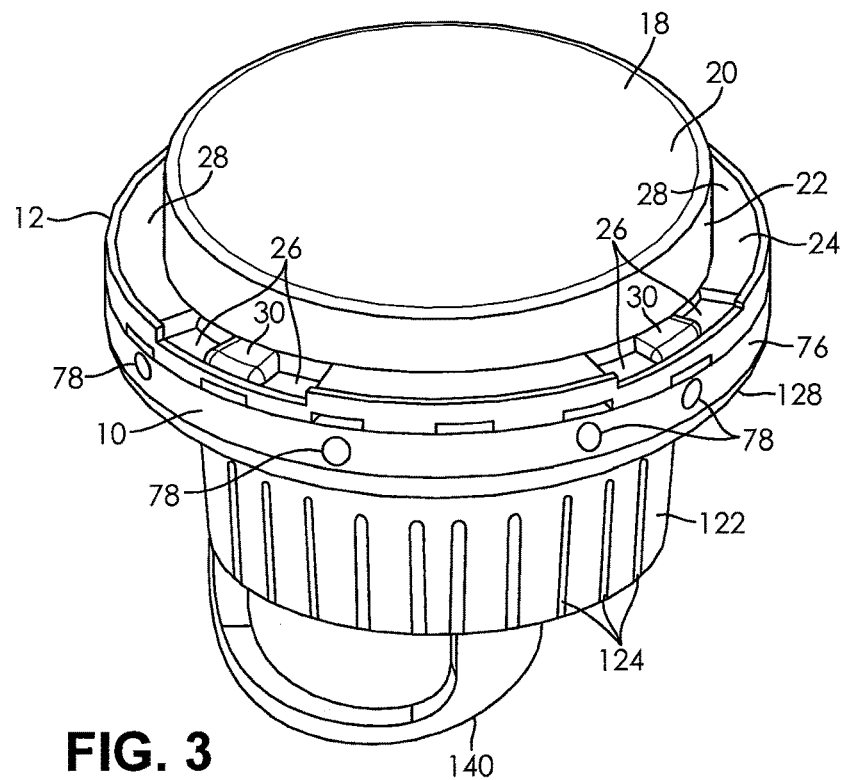
FIG. 3 is a top/side perspective view of the light source with the integral speed ring of FIG. 1.

The outer channel 44 is bounded at its outer diameter by an outer wall 54. The outer wall 54 at least partially extends circumferentially about the outer channel 44. The outer wall 54 preferably extends above the upper surface 40 of the support plate 42. Gaps 56 in the outer wall 54 may be provided at the recessed segment 46 locations, as shown in FIGS. 2, 3 and 7. The outer wall 54 defines an outer diameter 57 of the support plate 42.

The outer channel 44 may be bounded at its inner diameter by an inner wall 58. The inner wall 58 may extend at least partially circumferentially about the outer channel 44. Preferably, the inner wall 58 continuously extends about the inner diameter of the outer channel 44.

Radially inward of the inner wall 58 the support plate 42 further defines the upper surface 40. In this area, the upper surface is substantially planar. The planar upper surface 40 supports the LED plate 16 thereon. The LED plate 16 is substantially planar and parallel with the planar surface 40 of the support plate 42. The LED plate 16 has the plurality of LEDs 14 thereon.

Figure 9:
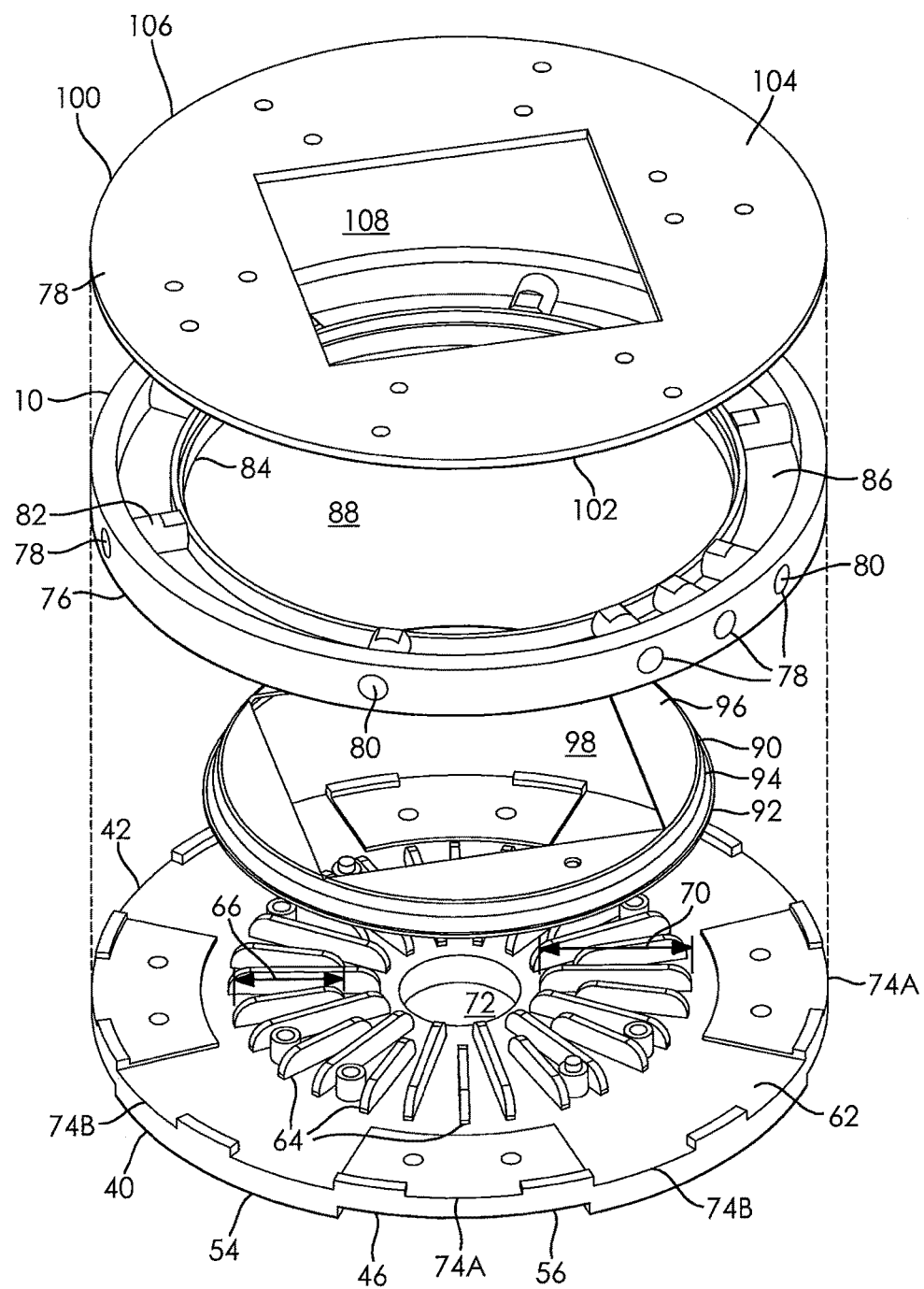
FIG. 9 is an exploded view of components of the light source.

Beneath the upper surface 40 of the support plate 42 is a lower surface 62, best seen in FIG. 9. The lower surface 62 may be provided with a plurality of fins extending axially downward. The fins may be integrally formed, one piece and unitary with the support plate 42. The fins may be comprised of radially extending fins. In one embodiment, the fins may alternatingly extend radially inward at two different distances. A first set of fins 64 extends to a first radial distance 66 and a second set of fins 68 extends to a second radial distance 70 that is radially larger than the first set 64. Both sets of fins 64, 68 may terminate at a radially outer location that is adjacent an inner ring of a speed ring (described below). Each of the fin sets 64, 68 may extend to the same extent in the axial direction.

Figure 6:
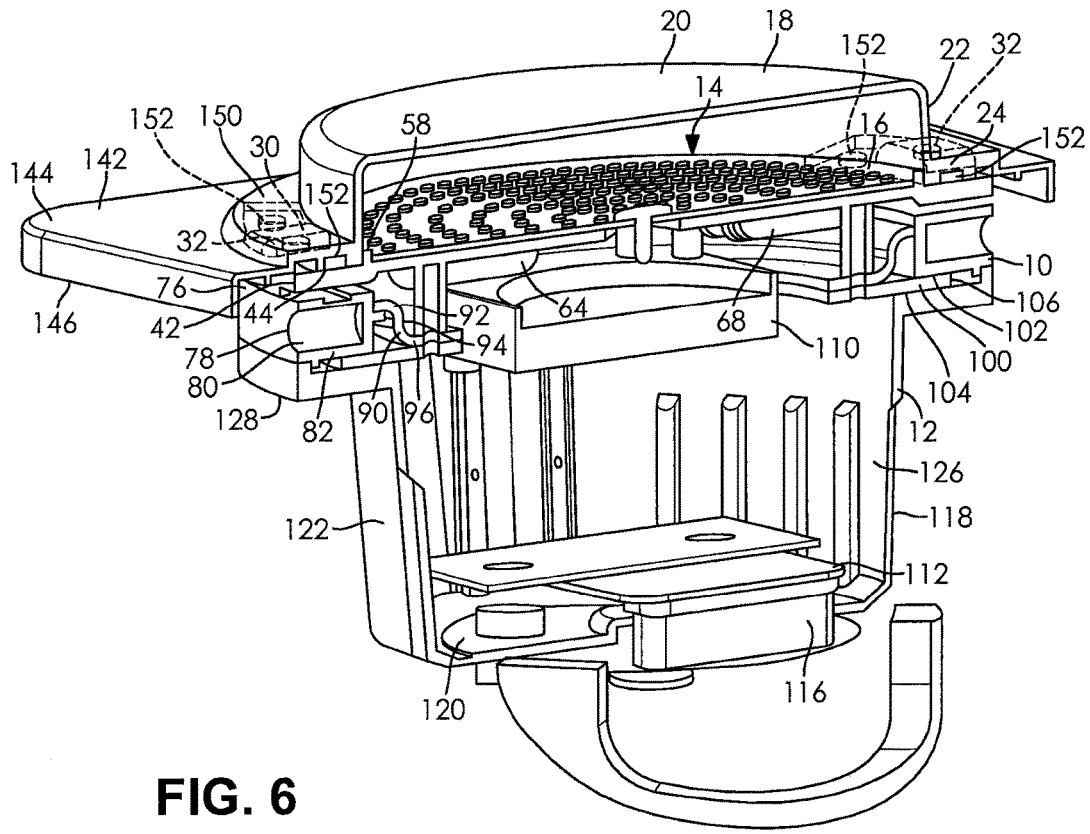
FIG. 6 is a perspective cutaway side view of the light source with the integral speed ring of FIG. 1.

As shown in FIGS. 6 and 9, a central aperture 72 is defined in the support plate 62. The central aperture 72 preferably extends from the lower surface 62 to the upper surface 40, thus entirely through the support plate 42. The central aperture 72 is located radially inboard the first and second set of fins 64, 68. The central aperture 72 may be for locating wires (not shown) extending to the LED plate 16 to a control module (described below).

Referring back to the outer diameter 57 of the support plate 42, a plurality of slots 74 are located in the outer diameter 57. More particularly, the slots 74 may be located at the lower surface 62 of the outer diameter 57 of the support plate 42.

The slots 74 may be circumferentially located about the outer diameter 57 on the lower surface 62. The slots 74 may be of equal length and shape or they may vary. In one embodiment shown in FIG. 7, the slots 74A located beneath the recessed segments 46 may have a reduced height compared with the other slots 74B. In addition, the slots 74A located beneath the recessed segments 46 may be wider than the other slots 74B. In both cases, the slots 74A, 74B are used as cooling channels that permit air into and out of the light source 12. The slots 74A, 74B may extend under the outer channel 44 to the plurality of fins 64, 68.

A selectively rotatable ring, called the speed ring 10, is located axially, directly beneath the support plate 42. The speed ring 10 may have a substantially constant outer diameter 76 that is substantially the same as the outer diameter 57 of the support plate 42, as shown in FIGS. 5 and 7.

A plurality of apertures 78 may be located in an outer diameter 76 of the speed ring 10. The apertures 78 may be round. Each aperture 78 may extend to a channel 80 of the same size and shape of the aperture 78 as shown in FIGS. 5-7. The channels 80 may all extend the same radial distance into the speed ring 10. The apertures 78 may not be equally spaced from one another about the outer diameter 76 of the speed ring 10. The apertures 78 are located about the speed ring 10 at locations common for matching with lighting fixture prongs/legs so that the prongs/legs from a wide variety of lighting fixture prongs/legs (not shown) of various makes/models can be located in the apertures 78 and channels 80.

The channels 80 may extend into lugs 82 of the speed ring 10, as shown in FIGS. 7 and 9. The lugs 82 may be located at each of the apertures 78 and channels 80. The lugs 82 extend radially inward from the outer diameter 76. The lugs 82 may be such as discrete tubular extensions from the outer diameter 76. The tubular extensions are larger (such as in diameter) than the apertures 78 and channels 80. Based on the foregoing, it can be appreciated that the lugs 82 are not equally spaced from one another about the speed ring 10.

Each of the lugs 82 extends to an inner ring 84 of the speed ring 10. The inner ring 84 may be a continuous circumferential ring connecting all of the lugs 82.

A connector channel 80 may extend circumferentially between the inner ring 84 and the outer diameter 76 on the underside of the speed ring 10, as shown in FIG. 9. The connector channel 80 is interrupted by the lugs 82.

The inner ring 84 defines a central aperture 88 of the speed ring 10. The apertures 78 and the channels 80 in the speed ring 10 are located about the central aperture 88.

A central plate 90 is located in the central aperture 88 of the speed ring 10. The central plate 90 is fixed to the support plate 42 both of which are stationary. The central plate 90 has an upper lip 92, a transition portion 94 and a lower flange 96. The central plate 90 may be integrally formed, unitary and one piece. The upper lip 92 may be located proximate the upper surface 42 of the support plate 40. The transition portion 94 extends in an axially curvilinear fashion from the upper lip 92 to the lower flange 96. The lower flange 96 may define a central aperture 98 therein. The central aperture 98 leaves a large percentage, or all, of the first and second set of fins 64, 68 uncovered. The central aperture 98 received the plurality of fins of the support plate 42. The speed ring 10 radially surrounds the central plate 90.

A housing plate 100 is provided as shown in FIGS. 5, 6 and 9. The housing plate 100 has an upper surface 102 and a lower surface 104. The upper and lower surfaces 102, 104 are both substantially planar resulting in a substantially constant thickness between them.

The housing plate 100 may have a circular outer diameter 106. The outer diameter 106 may abut against recessed sections 82A of the bottom surfaces 82B the lugs 82. The direct contact with the lugs 82 helps to position the housing plate 100 and secure it in place. The housing plate 100 is fixed with respect to the support plate 42 and the central plate 90.

The housing plate 100 may have a central opening 108. The central opening 108 may have a polygonal shape, such as square. The central opening 108 of the housing plate 100 may be complementary in shape and size to the central aperture of the central plate 90. Preferably, the central opening 108 and central aperture 98 are aligned with one another. The housing plate is fixed to the central plate, such as through mechanical fasteners.

The housing plate 100, central plate 90, support plate 42 and speed ring 10 may be constructed of metal, plastic and/or composite material. In any case, the housing plate 100, central plate 90, support plate 42 and speed ring 10 may be constructed of a temperature resistant material. The housing plate 100, central plate 90, support plate 42 and speed ring 10, respectively, may be unitary, one piece and integrally formed.

A fan 110 is positioned in the central opening 108 and the central aperture 98 as shown in FIGS. 6 and 7. The fan 110 may be polygonal in shape, such as square. Preferably, the fan 110 has a complementary shape and size the central opening 108 and central aperture 98 to fit therein. Mechanical fasteners extend through the housing for the fan 110 into the support plate 42. The fan 110 may be AC or DC powered; preferably it is AC powered.

The fan 110 and the LEDs 14 on the LED plate 16 are connected, such as through wires (not shown), to a printed circuit board 112. The circuit board 112 is connected to controls 114 that turn the fan 110 and/or LEDs 14 on/off, and/or changes the color temperature, hue, and/or intensity of the LEDs 14. Together, the controls 114 and the circuit board 112 comprise a control module 116.

The control module 116 may connected to the source of power (not shown). The connection may be made through wires (not shown). The source of power may be AC and/or DC type power.

The circuit board 112 is mounted within a housing as shown in FIGS. 5 and 6. In one embodiment, the circuit board 112 is mounted to one side of a back plate 120 of the housing 118. The other side of the black plate 120 has controls 114 mounted there on or there through.

A housing wall 122 extends upwardly (or axially) from the back plate 122. The housing wall 122 may be such as circular. A plurality of slots 124 may be located in the housing wall 122.

The back plate 120 and the housing wall 122 define an internal volume 126, as shown in FIGS. 5 and 6. The circuit board 112 is located within the internal volume 126. In addition, at least the fan 110 is located in the internal volume 126.

The housing wall 122 transitions to a housing flange 128. The housing flange 128 extends radially outwardly from the housing wall 122. The housing flange 128 may be transverse from the housing wall 122. The housing flange 128 may have a plurality of slots 130 located therein, as shown in FIGS. 1 and 2. The housing flange 128 has an outer diameter 132 defined by an upstanding lip 134.

The back plate 120, the housing wall 122 and the housing flange 128 may be one piece, integrally formed and unitary. These pieces may be constructed of plastic, but other materials such as metal or composites are permissible.

The housing flange 128 upstanding lip 134 may have a complementary shape and size to the outer diameter 76 of the speed ring 10. The housing flange 128 may be connected to the housing plate 100, such as through a plurality of mechanical fasteners (not shown).

The housing 118 is located axially below the speed ring 10, the central plate 90 and the support plate 42. The central plate 90 may be located within the housing flange 128, and the fan 110 may be located in the housing 118. The channels 80 in the speed ring 10 and the outer channel 44 in the support plate 42 are located axially about the housing flange 128. The speed ring 10 may selectively rotated with respect to the fixed housing 118 and housing plate 100.

A mounting arm 136 may be located on the housing wall 122 as shown in FIG. 4. An inner surface 138 of the housing wall 122 may be reinforced to support the mounting arm 136. The reinforcement may be such as a doubling of the housing wall 122 thickness along a column in the housing 118, as shown in FIG. 5. The mounting arm 136 may be secured to the housing wall 122 with mechanical fasteners (not shown). The mounting arm 136 permits the light source 12 to be attached to tripods or the like (not shown) to enable the light source 12 to function as a stand alone device.

A handle 140 may be located on the housing wall 122. In the depicted embodiment shown in FIG. 2, the handle 140 may be located on the housing wall 122 opposite the mounting arm 136. The handle 140 facilitates transport and positioning of the light source 12.

The fan 110 may be oriented so that it either pulls or pushes air into the light source 12. In one embodiment, the fan 110 draws ambient air through the housing wall slots 124. The air is drawn past the circuit board 112, which pulls heat away from the circuit board 112. The air is also drawn through the fan 110 and against the first and second set of fins 64, 68. The air pulls heat away from the fins 64, 68 and pushes it out through the gaps 56 in the support plate 42.

The speed ring 10 may be selectively moved. More particularly, the speed ring 10 may be selectively rotated with respect to the support plate 42, the housing plate 100 and the housing 118. The speed ring 10 may be rotated in both the clockwise or counterclockwise directions. It can be appreciated that a light modifier (not shown), attached to the speed ring 10, can then be readily rotated as well. As noted above, many different types of light modifiers may be connected and disconnected to the speed ring 10 without any additional structures or steps.

A barn door type mounting plate 142 may be connected to the light source 12. The barn door mounting plate 142 has an upper and a lower surface 144, 146. The plate 142 may be provided with a circular opening 148 complementary to the size and shape of the LED light plate 16 that extends from the upper 144 to the lower 146 surface.

A mounting flange 150 may surround the circular opening 148. The mounting flange 150 has a complementary shape to the outer channel 44 of the support plate 42. Magnets 152 may be located in the mounting flange 150. In one embodiment, magnets 152 may be located in sets of two where the sets are equally spaced about the mounting flange 150.

The magnet 152 permit selective coupling with the metal plates 38 in the outer channel 44 of the support plate 42. The magnets 152 permit selective coupling of the mounting flange 150 to the support plate 42. More particularly, the barn door type mounting plate 142 may be located on the outer channel 44 of the support plate 42 at the same time the cover 18 is located on the outer channel 44. Magnets 152 in the mounting flange 150 selectively couple with the plates 38 in the outer channel 44. The mounting flange magnets 152 may be located on either side of the cover magnets 32 so as to bound them.

Barn door type flaps 154 may be hinged to the upper surface 144 of the mounting flange 150. More particularly, four flaps 154 may be hinged about the mounting flange circular opening 148. Each of the flaps 154 may be selectively angled with respect the opening 148 to control the amount of light from the LEDs.

In accordance with the provisions of the patent statutes, the present invention has been described in what is considered to represent its preferred embodiments. However, it should be noted that the invention can be practiced otherwise than as specifically illustrated and described without departing from its spirit or scope

What is claimed is:

1. A light with an integral speed ring, comprising:
a cover having a support flange comprised of segments wherein at least one of the segments has a magnet on a lower surface;
a support plate having an upper surface and a lower surface wherein the upper surface defines an outer channel, wherein the outer channel has a least one recessed segment with a metallic plate located within the recessed segment;
wherein the at least one segment of the cover with the magnet is located in selective contact with the metallic plate located in the recessed segment of the outer channel;
wherein the lower surface of the support plate defines a plurality of fins and an outer diameter of the support plate defines a plurality of outer diameter gaps;
an LED plate with a plurality of LEDs mounted thereon located on the support plate; and
a ring, selectively rotatable with respect to said support plate and located beneath said support plate, said ring having a plurality of apertures located in an outer diameter of the ring.

2. The light of claim 1, wherein the cover has a planar top supported by a cylindrical upstanding wall with the support flange extending perpendicular from the upstanding wall.

3. The light of claim 2, wherein at least the planar top of the cover is translucent.

4. The light of claim 1, wherein the segments of the support flange are separated by openings of equal length.

5. The light of claim 1, wherein the segments are comprised of one set of long segments and one set of set short segments.

6. The light of claim 5, wherein the magnets are located on the short segments.

7. The light of claim 5, wherein the metallic plate is secured within the recessed segment with mechanical fasteners.

8. The light of claim 7, wherein an upper surface of the metallic plate is coplanar with the upper surface of the outer channel.

9. The light of claim 8, wherein the long segments are located on the upper surface of the outer channel and the short segments are located over the metallic plates.

10. The light of claim 1, wherein the outer channel is bounded at its outer diameter by an outer wall and the outer channel is bounded at its inner diameter by a continuous inner wall, wherein said outer wall has gaps at the recessed segment locations.

11. The light of claim 1, wherein the plurality of fins comprises a first set of fins extending radially inward to a first radial distance and a second set of fins extends radially inward to a second radial distance greater than the first radial distance.

12. The light of claim 11, wherein the plurality of outer diameter apertures open to radially inwardly extending channels within lugs that extend from said outer diameter under said outer channel to the plurality of fins.

13. The light of claim 1, further comprising a housing, the housing having a back plate, a housing wall and a housing flange extending radially outward from the housing wall, the back plate and the housing wall defining an internal volume.

14. The light of claim 13, wherein the housing flange receives the housing plate therein and the housing plate is secured to the housing flange.

15. The light of claim 14, wherein the channels in the ring and the outer channel of the LED plate are located axially above the housing flange.

16. The light of claim 1, wherein the plurality of apertures in the outer diameter of the ring are located at unequal distances from one another.

17. The light of claim 16, wherein said ring defines a central aperture around which said apertures and channels are located.

18. The light of claim 17, further comprising a central plate located in the central aperture of the ring, the central plate being fixed to the support plate, wherein the central plate defines an upper lip, a transition portion and a lower flange.

19. The light of claim 18, further comprising a housing plate having a central opening that is complementary in size and shape to the central aperture of the central plate, wherein the central opening is aligned with the central aperture.

20. The light of claim 19, further comprising a fan positioned in the central opening housing plate and secured to the support plate.

21. A light with an integral speed ring, comprising:
a support plate having an upper surface and a lower surface, wherein the upper surface defines an outer channel, wherein the outer channel has a least one recessed segment with a metallic plate located within the recessed segment, wherein the lower surface of the support plate defines a plurality of fins and an outer diameter of the support plate defines a plurality of outer diameter gaps;
an LED plate with a plurality of LEDs mounted thereon located on the upper surface of the support plate; and
a ring, selectively rotatable with respect to said support plate, said ring having a plurality of apertures located in an outer diameter of the ring.

22. The light of claim 21, wherein said ring apertures unequally spaced from one another on the outer diameter of the ring, said apertures are connected to channels located within radially inwardly extending lugs of the ring, said lugs extend to an inner ring.

23. The light of claim 21, wherein said ring can rotate in a clockwise and counterclockwise direction with respect to said support plate.

24. The light of claim 21, further comprising a central plate having a central aperture that receives the plurality of fins of the support plate therein, wherein said ring surrounds said central plate.

25. The light of claim 21, further comprising a housing plate having a central opening complementary to the central aperture, said housing plate is fixed to said central plate.

26. The light of claim 21, further comprising a cover having a support flange comprised of segments, wherein selected segments have magnets therein, wherein said support flange selectively fits within said outer channel of said support plate.

27. The light of claim 26, further comprising a barn door mounting plate having a mounting flange with an opening complementary to the outer channel of the support plate, wherein magnets are located within said mounting flange so that when said cover is selectively located on said outer channel and said mounting flange is selectively located on said outer channel the mounting flange magnets bound each magnet in said cover.

* * * * *